United States Patent [19]
Lee

[11] Patent Number: 5,353,066
[45] Date of Patent: Oct. 4, 1994

[54] METHOD FOR PREVENTING THE DETERIORATION OF PICTURE QUALITY IN A VIDEO PROCESSOR AND CIRCUIT THEREOF

[75] Inventor: Chan-gu Lee, Suwon, Rep. of Korea

[73] Assignee: Samsung Electronics Co., Ltd., Kyungki-do, Rep. of Korea

[21] Appl. No.: 147,570

[22] Filed: Nov. 5, 1993

[30] Foreign Application Priority Data

Nov. 5, 1992 [KR] Rep. of Korea ............... 92-20700

[51] Int. Cl.$^5$ .................. H04N 9/70; H04N 9/455; H04N 5/12
[52] U.S. Cl. .................. 348/505; 348/536; 348/549; 348/643; 348/663
[58] Field of Search ........... 348/505, 506, 507, 512, 348/525, 536, 537, 538, 539, 549, 609, 618, 643, 644, 663, 664, 665, 666, 667, 408, 409, 533; H04N 9/44, 9/45, 9/455, 9/475, 9/70, 9/71, 5/08, 5/10, 5/12

[56] References Cited

U.S. PATENT DOCUMENTS

| | | | |
|---|---|---|---|
| 3,975,759 | 8/1976 | Taniguchi et al. | 348/643 |
| 4,212,027 | 7/1980 | Lemaine | 348/505 |
| 4,847,678 | 7/1989 | McCauley | 348/537 |
| 4,930,003 | 5/1990 | Hoseya | 342/507 |
| 4,985,757 | 1/1991 | Yasuhi et al. | 348/549 |
| 5,025,310 | 6/1991 | Sekiya et al. | 348/542 |

FOREIGN PATENT DOCUMENTS

| | | | |
|---|---|---|---|
| 0041295 | 2/1986 | Japan | H04N 11/00 |
| 0117092 | 5/1991 | Japan | H04N 9/07 |

*Primary Examiner*—James J. Groody
*Assistant Examiner*—Michael H. Lee
*Attorney, Agent, or Firm*—Sughrue, Mion, Zinn, Macpeak & Seas

[57] ABSTRACT

A method and circuit for preventing the deterioration of picture quality in a video processor is disclosed in which, when an input color video signal is input, a clock signal for a combfilter is locked with a phase-locked loop (PLL) by a burst signal and when a monochrome video signal without the burst signal is input, the clock signal is locked by the output (quasi-burst signal) of a voltage-controlled oscillator of the PLL circuit, before the lapse of one horizontal period, so that the clock signal is constantly locked by a multiple (4 fsc) of the burst signal regardless of the presence or absence of the burst signal of the input video signal. According to a color/mono signal discriminating result, either the burst signal or the quasi-burst signal is selected as a reference signal so that the reference signal is locked to provide a clock signal having a constant phase and frequency, thereby preventing aliasing due to clock variations when the monochrome signal is input and thus improving picture quality.

13 Claims, 2 Drawing Sheets

METHOD FOR PREVENTING THE DETERIORATION OF PICTURE QUALITY IN A VIDEO PROCESSOR AND CIRCUIT THEREOF

BACKGROUND OF THE INVENTION

The present invention relates to a method for preventing the deterioration of picture quality in a video processor and circuit thereof, and more particularly, to a method and circuit for preventing picture quality deterioration which is caused by aliasing created due to the change of a clock for a combfilter, because of the absence of a burst signal when processing a monochrome signal, in a digital combfilter which uses the clock responding to the burst signal.

Generally, a video signal processor for separating a video signal (for instance, an NTSC signal) into a luminance (Y) signal and a chrominance (C) signal uses a 1H combfilter Recently, a frame combfilter, which employs a frame memory in Y/C separation, has been in practical use.

The video signal processor is used for, among other things, processing a composite video signal. Generally, in order to help modulate the color components of the composite video signal, the processor has a burst-locked clock generator for generating a clock signal which is locked by a burst signal. For sampling and signal processing, the generated clock signal is provided to a digital signal processor. The burst-locked clock generator, normally, is coupled to be responsive to the burst component of the composite video signal prior to the separation of the luminance and chrominance component.

The clock signal generated from the burst-locked clock generator for digital-combfilter-processing is generally processed such that the output of a 3.58 MHz (3.57945 MHz for NTSC) oscillator used in a video signal encoder or decoder is multiplied by four and expressed as 4fsc. The use of 4fsc facilitates signal processing, but can be varied.

FIG. 1 is a block diagram partially showing a video processor containing a conventional combfilter and clock a generator for the combfilter, each of which processes the Y signal and C signal by 1H.

In FIG. 1, before tile analog-to-digital (A/D) conversion of an input video signal by an A/D converter 102, a low-pass filter (LPF) 101 is employed as an anti-aliasing filter. To optimize resolution the bandwidth is designed so that the frequency (cut-off frequency) at a point at which gain is lowered below 3 dB is 7 MHz. In other words, LPF 101 greatly attenuates the signal above 7 MHz so as to remove high-band noise components and aliasing of a signal component is created below -3 dB.

Here, aliasing is a phenomenon in which frequency mixing between spacial high frequency components occurs when a video signal is subsampled. In order to prevent the aliasing, subsampling should be performed after low-pass-filtering. When the original spectrum of a video signal is sampled, repetitive spectra are created centering on sampling ratio fs. If the video signal is subsampled simply by two to one, spectrum folding of high frequency components is created. In order to properly subsample, according to the sampling frequency during the subsampling, baseband filtering (low-pass-filtering) should be performed in advance. By doing this, the spectrum has no aliasing.

When the attenuation characteristic of an anti-aliasing filter is ideal, interference due to the aliasing does not occur. However, in the case of an LC filter or Chebyshev filter used as the anti-aliasing filter at present, aliasing interference takes place above about 4 MHz.

However, in a moving picture, human eyes cannot perceive the phenomenon as noise. Even in a still picture, if the clock for a digital combfilter 103 is constant and does not change, the interference due to the aliasing is uniformly displayed on a screen, it is not offensive to the human eye.

A clock signal for the signal processing of digital combfilter 103 is output from a frequency multiplier 108. The clock signal is made by multiplying 3.58 MHz by four, which is locked by a voltage-controlled oscillator 107 of a phase-locked loop (PLL), while taking as a reference signal the burst signal of a composite video signal input CV. Here, the PLL corresponds to a comparator/control voltage generator 106 and voltage-controlled oscillator 107.

Meanwhile, if the input video signal is a monochrome signal (mono video signal) free from a color synchronizing signal (burst signal), since there is no reference signal of the PLL, the oscillating frequency of voltage-controlled oscillator 107, which generates 3.58 MHz, is varied.

The varied output of voltage-controlled oscillator 107 is multiplied by four in frequency multiplier 108, so as to be output as a sampling clock of A/D converter 102 and D/A converter 104 and a signal processing clock of digital combfilter 103. Thus, the sampling clock and signal processing clock of combfilter 103 are varied to be shown as frequency variation.

Due to this, if the input mono signal is a still picture, aliasing is created and is offensive to the human eye, thereby deteriorating picture quality.

A video signal processor system incorporating a burst locked clock generator responding to a separated color signal provided by a combfilter is disclosed in U.S. Pat. No. 5.132.784.

The combfilter disclosed in the above US patent passes an uncombfiltered video signal during a burst period in response to a burst gate signal, so as to improve the response time of the clock generator.

Though, during intervals other than the burst period, the system generates a phase-controlled clock signal using the separated color signal and burst signal of the input video signal, the system does not disclose a low-pass filter for preventing aliasing. Further, when a mono signal without a burst signal is input, aliasing due to clock variations occurs.

In a camcorder, an external synchronizing circuit for generating a color burst signal when a monochrome video signal or color signal is discriminated according to the presence or absence of a burst signal and a monochrome video synchronizing signal without the burst signal is externally input, is disclosed in Japanese Laid-open Patent Application No. sho 62-219877.

When employed in a camera, the circuit is used to stably reproduce an input color signal by generating a color burst signal using a fixed oscillator, even if the monochrome synchronizing signal without the color burst signal is input.

SUMMARY OF THE INVENTION

Therefore, it is an object of the present invention to provide a method and circuit of a video processor which, when a monochrome signal without a burst signal is input, generates a clock signal responding to a quasi-burst signal and using the clock signal as a clock for a digital combfilter, so as to prevent picture quality deterioration due to high-band noise.

It is another object of the present invention to provide a method and circuit for preventing picture quality deterioration due to aliasing, in which, when a monochrome signal without a burst signal is input in a digital combfilter for separating a video signal, which is low-pass-filtered so as to prevent aliasing, into a luminance signal and a chrominance signal, an oscillating signal in which the oscillating frequency of a burst-locked clock generator responding to the burst signal is used as the clock of the digital combfilter.

To accomplish the objects, there is provided a method for preventing the deterioration of picture quality in a video processor which has a combfilter for separating a video signal containing a burst signal into luminance and chrominance signals and uses a clock signal to process a signal for the combfilter, the method comprising the steps of; discriminating whether the video signal is a color signal or a monochrome (mono) signal; generating the clock signal according to a reference signal; generating a quasi-burst signal by delaying the generated clock signal for a predetermined period; and selecting the burst signal loaded on the input video signal when the color signal is discriminated in the discriminating step, or selecting the quasi-burst signal when the mono signal is discriminated in the discriminating step, so as to send the selected signal as the reference signal of the clock signal generating step, whereby a constant clock signal is generated regardless of whether the input video signal is the color signal the mono signal, so as to prevent high-band noise due to clock variations created when the mono signal without the burst signal is input.

Further, to accomplish the objects, there is provided a circuit for preventing the deterioration of the picture quality in a video processor which has a combfilter for separating a video signal containing a burst signal into luminance and chrominance signals and rises a clock signal to process a signal for the combfilter, the circuit comprising: a circuit for discriminating whether the video signal is a color signal or a monochrome signal according to the presence or absence of the burst signal in the video signal; a burst-locked clock generator for generating the clock signal according to the burst signal which is taken as a reference signal; a circuit for generating a quasi-burst signal by delaying the clock signal for a predetermined period; and a circuit for outputting the burst signal loaded on the video signal or the quasi-burst signal to the burst locked clock generator as the reference signal, according to the discriminated result of the discriminating circuit, whereby a constant clock signal is generated regardless of whether the input video signal is the color signal or the mono signal, so as to prevent high-band noise due to clock variations created when the mono signal without the burst signal is input.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

In the following description of FIG. 2, like elements are numbered with the like numerals as in FIG. 1.

Figure 2:
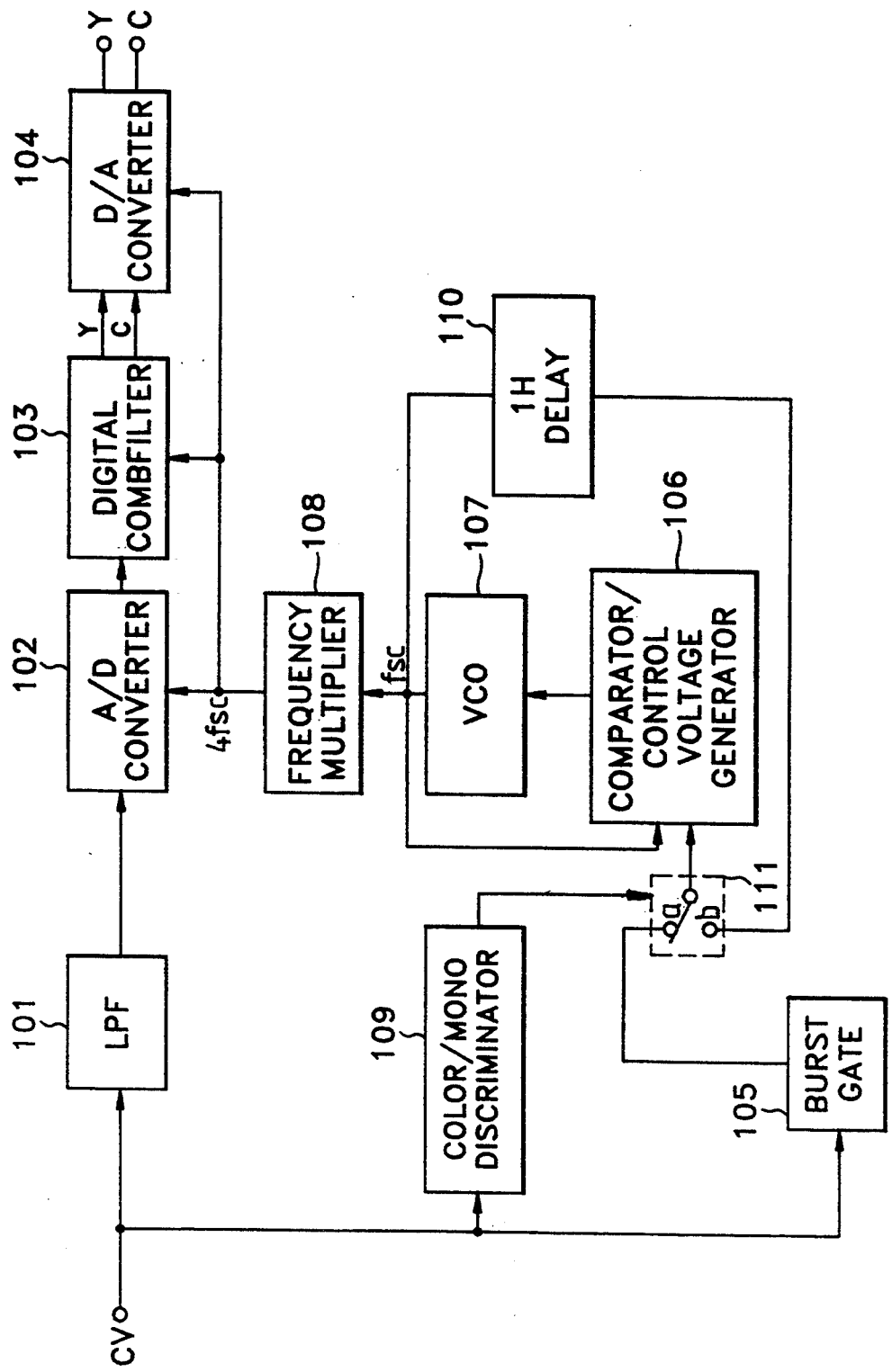
FIG. 2 is a block diagram of one embodiment of a picture quality deterioration preventing circuit of a video processor of the present invention.

Referring to FIG. 2, the picture quality deterioration circuit of the present invention comprises a low-pass filter (LPF) 101 for low-pass-filtering a composite video signal input from a composite video signal input port CV and which has a cut-off frequency so as to remove high-band noise (aliasing), an A/D converter 102 for converting the analog output from low-pass filter 101 into digital data, a digital combfilter 103 for separating the output of A/D converter 102 into Y and C signals, a D/A converter 104 for converting the digital Y and C signals output from digital combfilter 103 into analog Y and C signals, a burst gate 105 for detecting a burst signal from the video signal input from composite video signal input port CV, a voltage-controlled oscillator (VCO) 107 for receiving a control voltage so as to generate a 3.58 MHz signal, (fse) a comparator/control voltage generator 106 for comparing a reference signal with the output of voltage-controlled oscillator 107 so as to produce a control voltage for voltage-controlled oscillator 107, a frequency multiplier 108 for multiplying the 3.58 MHz (fsc) signal of voltage control oscillator 107 by four, so as to send the multiplied-by-four signal (4fsc) as a sampling clock signal for A/D converter 102 and D/A converter 104 and as a signal-processing clock for digital combfilter 103, a color/mono discriminating circuit 109 for discriminating whether the video signal input from composite video signal input port CV is a color signal or mono signal according to the presence or absence of a burst signal, a 1H delay 110 for delaying the output of voltage-controlled oscillator 107 for one horizontal period (1H), and a controlling switch 111 for selecting one of the outputs of 1H delay 110 and burst gate 105 according to the output of color/mono discriminating circuit 109 so as to provide the selected one as the reference signal.

Now, the operation of the picture quality deterioration circuit of FIG. 2 will be described hereinbelow.

If a video signal input from composite video signal input port CV is a color composite video signal (hereinafter referred to as a color signal), color/mono discriminating circuit 109 outputs a "HIGH" signal and controlling switch 111 is switched to port "a".

The burst signal output from burst gate 105 is sent as a reference signal for comparator/control voltage generator 106 which then compares the reference signal with the 3.58 MHz output of voltage-controlled oscillator 107, so that a control voltage, which synchronizes the 3.58 MHz output with the reference signal, is sent to voltage-controlled oscillator 107 for generating 3.58 MHz.

The output (fsc) of voltage-controlled oscillator 107 is multiplied by four in frequency multiplier 108. The multiplied signal (4fsc) is applied as a sampling clock signal of A/D converter 102 and D/A converter 104 and a signal-processing clock signal of digital combfilter 103.

Therefore, if the input signal is a color signal, in A/D converter 102, an analog signal low-pass-filtered by low-pass filter 101 is converted into digital form by a clock (4fsc) locked by the input burst signal. The digital data is then separated into Y and C signals in digital combfilter 103 and output via D/A converter 104.

Here, as mentioned before, in order to prevent the aliasing, low-pass filter 101 low-pass-filters a video signal which has in turn a predetermined frequency (here, 7 MHz). Digital combfilter 103 may be formed in combination of the configuration of the above-mentioned U.S. Pat. No. 5,132,784) and well-known technology.

If the input signal is a monochrome video signal (hereinafter referred to as a mono signal), color/mono discriminating circuit 109 outputs a "LOW" signal and controlling switch 111 is connected to port "b".

Controlling switch 111 selects the output of 1H delay 110 for 1H delaying the output of voltage-controlled oscillator 107 so that the selected output is output as the reference signal of comparator/control voltage generator 106. Here, the output of 1H delay 110 becomes a 3.58 MHz quasi-burst signal.

Comparator/control voltage generator 106 compares the 3.58 MHz output of voltage-controlled oscillator 107 before 1H with the present output thereof so that a control voltage, which synchronizes the output with the reference signal output from 1H delay 110 (3.58 MHz from voltage-controlled oscillator 107 prior to 1H), is output to voltage-controlled oscillator 107 which thereby generates 3.58 MHz.

The 3.58 MHz output of voltage-controlled oscillator 107 whose phase and frequency are locked, is multiplied by four in frequency multiplier 108 and applied to A/D converter 102, digital combfilter 103 and D/A converter 104.

A/D converter 102 converts an analog signal which is low-pass-filtered by low-pass filter 101 into digital data, using a clock generated by frequency multiplier 108.

The output of A/D converter 102 is separated into Y and C signals by digital combfilter 103. The separated signals are output as analog Y and C signals in D/A converter 104.

Figure 1:
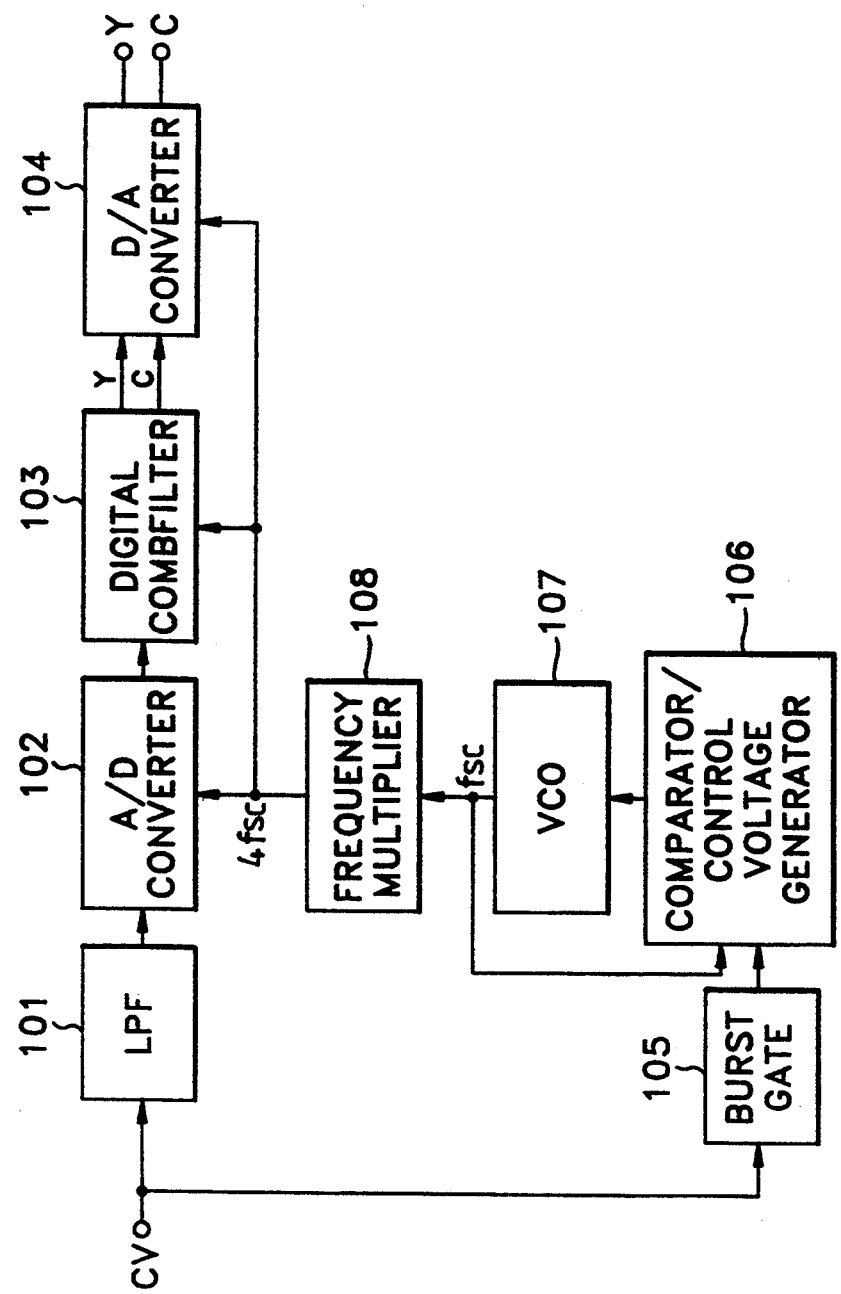
FIG. 1 is a block diagram partially showing a video processor containing a conventional combfilter and clock generator for use with the combfilter.

According to the present invention which additionally includes, relative to the conventional processor shown in FIG. 1, a color/mono signal discriminating circuit 109, 1H delay 110 and controlling switch 111, if a mono signal without a burst signal is input, the 3.58 MHz output of the voltage control oscillator is delayed for 1H to generate a quasi-burst signal which is set to be an input reference signal of PLL. Using the reference signal, the clock signal locked by predetermined multiple of 3.58 MHz is used as a clock signal for the digital combfilter, so that the aliasing interference, if any, is uniformly created. Accordingly, the present invention provides a more pleasing effect to the human eye, thereby preventing the deterioration of picture quality.

As another embodiment of the present invention, a 4fsc voltage-controlled oscillator may be employed for voltage control oscillator 107 and frequency multiplier 108, and the delay time of 1H delay 110 which locks the phase and frequency of the output of voltage control oscillator 107, may be appropriately controlled.

If a clock generator is additionally provided, since a clock should be locked with a color signal, color/mono discriminating circuit 109, 1H delay 110 and controlling switch 111 may be used for the clock generator in order to prevent the deterioration of picture quality during the input of a monochrome signal.

As described above, in the method and circuit of preventing the deterioration of picture quality for a video processor of the present invention, an input video signal, which is low-pass-filtered to prevent aliasing and separated into luminance and chrominance signals by a digital combfilter, is processed by a clock having a constant phase and frequency regardless of whether the video signal is a color or monochrome signal, to thereby minimize the interference due the aliasing and improve picture quality.

What is claimed is:

1. A method for preventing the deterioration of picture quality in a video processor which has a combfilter for separating a video signal, containing a burst signal, into luminance and chrominance signals and which uses a clock signal to process a signal for said combfilter, said method comprising the steps of:

discriminating whether the video signal is a color signal or a monochrome (mono) signal;

generating said clock signal locked by a reference signal;

generating a quasi-burst signal by delaying said generated clock signal for a predetermined period; and selecting the burst signal contained on the input video signal when the color signal is discriminated in said discriminating step, and selecting said quasi-burst signal when the mono signal is discriminated in said discriminating step, so as to send the selected signals as said reference signal of said clock signal generating step, whereby a constant clock signal is generated regardless of whether the input video signal is the color signal or the mono signal, so as to prevent highband noise due to clock variations created when the mono signal without the burst signal is input.

2. A method for preventing the deterioration of picture quality in a video processor as claimed in claim 1, wherein said clock signal generating step includes generating a clock signal having a frequency which is a predetermined multiple of that of the burst signal.

3. A method for preventing the deterioration of picture quality in a video processor which has a combfilter for separating a video signal, which contains a burst signal and which is low-pass-filtered to prevent aliasing, into luminance and chrominance signals and uses a clock signal to process a signal for said combfilter, said method comprising the steps of:

discriminating whether said video signal is a color signal or a mono signal;

gating the burst signal contained on the input video signal;

outputting said clock signal locked by a reference signal to said combfilter;

outputting a feedback signal by delaying said clock signal for a predetermined period; and selecting the burst signal of said burst signal gating step when the color signal is discriminated in said signal discriminating step, and selecting the feedback signal of said clock signal outputting step when the mono signal is discriminated in said signal discriminating step, so as to send the selected signal as said reference signal of said clock signal outputting step, whereby a constant clock signal is generated regardless of whether the input video signal is the color signal or the mono signal, so as to prevent aliasing due to clock variations created when the mono signal without the burst signal is input.

4. A method for preventing the deterioration of picture quality in a video processor as claimed in claim 3, wherein said clock signal outputting step includes generating a clock signal having a frequency which is a predetermined multiple of that of the burst signal.

5. A circuit for preventing the deterioration of picture quality in a video processor which has a combfilter for separating a video signal, which contains a burst signal, into luminance and chrominance signals, a clock signal being used to process a signal through said combfilter, said circuit comprising:
- a color/mono discriminator which discriminates whether the video signal is a color signal or a mono signal according to the presence or absence of the burst signal in the video signal;
- a burst-locked clock generator for generating said clock signal according to the burst signal which is taken as a reference signal;
- a generator for generating a quasi-burst signal by delaying said clock signal for a predetermined period; and
- an output device for outputting the burst signal contained on the video signal or the quasi-burst signal to said burst-locked clock generator as the reference signal, according to the discriminated result of said color/mono discriminator,
- whereby a constant clock signal is generated regardless of whether the input video signal is the color signal or the mono signal, so as to prevent high-band noise due to clock variations created when the mono signal without the burst signal is input.

6. A circuit for preventing the deterioration of picture quality in a video processor as claimed in claim 5, wherein said burst-locked clock generator comprises:
- a voltage-controlled oscillator for receiving a control voltage so as to output the frequency of the burst signal;
- a comparator/control voltage generator for comparing the reference signal with the output of said voltage-controlled oscillator, to thereby produce the control voltage for said voltage-controlled oscillator; and
- a frequency multiplier for multiplying the output of said voltage-controlled oscillator by a predetermined number.

7. A circuit for preventing the deterioration of picture quality in a video processor which has a combfilter for separating a video signal, containing a burst signal, which is low-pass-filtered to prevent aliasing into luminance and chrominance signals, a clock signal being used to process a signal through said combfilter, said circuit comprising:
- means for discriminating whether the video signal is a color signal or a mono signal according to the presence or absence of the burst signal;
- means for gating the burst signal loaded on the input video signal;
- means for generating and outputting said clock signal having a predetermined frequency locked by a reference signal to said combfilter;
- means for outputting a feedback signal by delaying said output clock signal for a predetermined period; and
- means for selecting the burst signal of said burst signal gating means when the video signal is a color signal or selecting the feedback signal of said feedback signal output means when the video signal is a mono signal, according to the discriminated result of said discriminating means, and outputting the selected signal as said reference signal of said clock signal generating means,
- whereby a constant clock signal is generated regardless of whether the input video signal is the color signal or the mono signal, so as to prevent aliasing due to clock variations created when the mono signal without the burst signal is input.

8. A circuit for preventing the deterioration of picture quality in a video processor which receives an analog video signal, the circuit comprising:
- a filter for low-pass-filtering an input video signal so as to remove noise due to the high-band component of the video analog signal;
- analog-to-digital (A/D) converter for converting said low-pass-filtered video analog signal into a digital video signal;
- a combfilter for separating said digital video signal containing an input burst signal into digital luminance and chrominance signals using a clock signal;
- a digital-to-analog (D/A) converter for converting the digital luminance and chrominance signals output from said combfilter into analog luminance and chrominance signals;
- a burst signal gate for detecting a burst signal from the input video signal;
- clock signal generator for outputting a clock signal having a predetermined frequency locked by a reference signal as the sampling clock signal of said A/D converter and D/A converter, and simultaneously outputting the clock signal to said combfilter as a signal-processing clock signal;
- delay unit for delaying the clock signal generated by said clock signal generator and outputting a feedback signal;
- a discriminator for discriminating whether the input video signal is a color signal or a mono signal; and
- a selection unit for selecting the burst signal when the video signal is the color signal or selecting the feedback signal when the video signal is the mono signal, according to the discriminated result of said discriminator, and outputting the selected signal as said reference signal of said clock signal generator,
- whereby a constant clock signal is generated regardless of whether the input video signal is the color signal or the mono signal, so as to prevent aliasing due to clock variations created when the mono signal without the burst signal is input.

9. A circuit for preventing the deterioration of picture quality in a video processor as claimed in claim 8, wherein said delay unit delays the output of said clock signal generating means for one horizontal period.

10. A circuit for preventing the deterioration of picture quality in a video processor as claimed in claim 8, wherein said clock signal generator comprises:
- a voltage-controlled oscillator for receiving a control voltage so as to produce a multiple of the reference signal frequency; and
- a comparator/control voltage generator for comparing the reference signal with the output of said voltage-controlled oscillator, to thereby produce the control voltage for said voltage-controlled oscillator.

11. A circuit for preventing the deterioration of picture quality in a video processor claimed in claim 8, wherein said clock signal generator comprises:
- a voltage-controlled oscillator for receiving a control voltage so as to output the frequency of said reference signal;
- a comparator/control voltage generator for comparing said reference signal with the output of said voltage-controlled oscillator, to thereby produce the control voltage for said voltage control oscillator; and
- a frequency multiplier for multiplying the output of said voltage-controlled oscillator by a predetermined number and transmitting the output to said combfilter.

12. A method for preventing the deterioration of picture quality in a video processor which includes at least one filter and at least one converter which operate according to a generated frequency signal, the method comprising the steps of:
- receiving a video signal;
- determining whether the received video signal includes a burst signal; and
- modifying the generated frequency signal according to the burst signal when it is determined by said determining step that the received video signal include the burst signal, and modifying the generated frequency signal according to a previously generated frequency signal when it is determined by said determining step that the received video signal does not include the burst signal.

13. The method defined in claim 12, wherein said determining step includes determining whether the received video signal is a color or a mono video signal.

* * * * *